(12) United States Patent
Tsai

(10) Patent No.: US 12,736,864 B2
(45) Date of Patent: Sep. 15, 2026

(54) COLOR WHEEL MODULE AND PROJECTION DEVICE

(71) Applicant: Coretronic Corporation, Hsin-Chu (TW)

(72) Inventor: Chia-Lun Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 281 days.

(21) Appl. No.: 18/732,632

(22) Filed: Jun. 4, 2024

(65) Prior Publication Data

US 2024/0411214 A1 Dec. 12, 2024

(30) Foreign Application Priority Data

Jun. 6, 2023 (CN) ........................ 202310660490.7

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2066* (2013.01)

(58) Field of Classification Search
CPC ............ G03B 21/00–64; G02B 26/008; H04N 9/31–3197
See application file for complete search history.

(56) References Cited

U.S. PATENT DOCUMENTS

2012/0242912 A1* 9/2012 Kitano ...................... F21V 9/08 362/19
2014/0043829 A1* 2/2014 Wu ......................... F21V 13/08 362/324
2023/0141316 A1* 5/2023 Hsu ...................... G03B 21/204 353/31

FOREIGN PATENT DOCUMENTS

CN 109991803 7/2019
CN 211403095 9/2020
CN 211577647 9/2020

* cited by examiner

*Primary Examiner* — Christopher A Lamb, II
(74) *Attorney, Agent, or Firm* — JCIPRNET

(57) ABSTRACT

A color wheel module and a projection device. The color wheel module includes a driving element, a first rotating member, a second rotating member and an annular optical member. The first rotating member includes a first reflective area, a second reflective area and a wavelength conversion material. The second reflective area is connected to the first reflective area, and the first reflective area is inclined to the second reflective area. The wavelength conversion material is disposed on the first reflective area. The second rotating member is connected to the first reflective area. The annular optical member is disposed between the first rotating member and the second rotating member to form an optical cavity with the first rotating member and the second rotating member, one of the second rotating member and the annular optical member includes a dichroic layer, and the other includes a filter area and a transmission area.

22 Claims, 11 Drawing Sheets

142
100
130A
124
126_1
122
150
112
126_1
126_2
122
124
126A
120
110
126_2
148

COLOR WHEEL MODULE AND PROJECTION DEVICE

CROSS-REFERENCE TO RELATED APPLICATION

This application claims the priority benefit of China application serial no. 202310660490.7, filed on Jun. 6, 2023. The entirety of the above-mentioned patent application is hereby incorporated by reference herein and made a part of this specification.

BACKGROUND

Technical Field

The disclosure relates to an optical module and an electronic device, and in particular to a color wheel module and a projection device.

Description of Related Art

The imaging principle of a projection device is to convert an illumination beam generated by an illumination system into an image beam through a light valve, and then project the image beam to a projection target (such as a screen or a wall) through a projection lens to form a projection screen.

In the current illumination system, a light source, a phosphor wheel and a filter wheel are often used in conjunction with each other to generate an illumination beam. The phosphor wheel and the filter wheel are usually two independent elements, and are respectively disposed in two areas on a light path. However, if the rotation of the phosphor wheel and the filter wheel is out of sync or an abnormality occurs, such situation causes flickering on a projection screen, and in severe cases, causes a projection device to shut down abnormally. In addition, the phosphor wheel and the filter wheel occupy a relatively large space in the illumination system. If the volume of the projection device is to be reduced, a problem of space limitation occurs.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a color wheel module and a projection device, which may reduce the number of elements thereof, thereby reducing the volume. At the same time, the luminous efficiency of the color wheel module may be improved.

Other objectives and advantages of the disclosure may be further understood from the technical features disclosed in the disclosure.

In order to achieve one or part or all of the above-mentioned objectives or other objectives, the disclosure provides a color wheel module, which is disposed on the transmission path of an excitation beam. The color wheel module includes a driving element, a first rotating member, a second rotating member and an annular optical member. The driving element includes a rotating shaft, and the driving element is configured to drive the first rotating member and the second rotating member to rotate. The first rotating member is disposed on the rotating shaft, and the first rotating member includes a first reflective area, a second reflective area and a wavelength conversion material. The second reflective area is connected to the outer edge of the first reflective area, and the first reflective area is inclined to the second reflective area. The wavelength conversion material is disposed on the first reflective area and is configured to convert the excitation beam into a conversion beam. The second rotating member is disposed on the rotating shaft and connected to the first reflective area of the first rotating member. The annular optical member is disposed between the first rotating member and the second rotating member to form an optical cavity with the first rotating member and the second rotating member, one of the second rotating member and the annular optical member includes a dichroic layer, and the other includes a filter area and a transmission area.

To achieve one or part or all of the above-mentioned objectives or other objectives, the disclosure further provides a projection device, which includes an illumination system, a light valve and a projection lens. The illumination system is configured to provide an illumination beam. The illumination system includes a light source module and a color wheel module. The light source module is configured to provide an excitation beam. The color wheel module is disposed on the transmission path of the excitation beam. The color wheel module includes a driving element, a first rotating member, a second rotating member and an annular optical member. The driving element includes a rotating shaft, and the driving element is configured to drive the first rotating member and the second rotating member to rotate. The first rotating member is disposed on the rotating shaft, and the first rotating member includes a first reflective area, a second reflective area and a wavelength conversion material. The second reflective area is connected to the outer edge of the first reflective area, and the first reflective area is inclined to the second reflective area. The wavelength conversion material is disposed on the first reflective area and is configured to convert the excitation beam into a conversion beam. The second rotating member is disposed on the rotating shaft and connected to the first reflective area of the first rotating member. The annular optical member is disposed between the first rotating member and the second rotating member to form an optical cavity with the first rotating member and the second rotating member, one of the second rotating member and the annular optical member includes a dichroic layer, and the other includes a filter area and a transmission area. The light valve is disposed on the transmission path of the illumination beam, and is configured to convert the illumination beam into an image beam. The illumination beam includes at least one of the excitation beam and the conversion beam. The projection lens is disposed on the transmission path of the image beam, and is configured to project the image beam out of the projection device.

Based on the aforementioned, the embodiments of the disclosure have at least one of the following advantages or effects. In the color wheel module and the projection device of the disclosure, the color wheel module includes a driving element, a first rotating member, a second rotating member and an annular optical member. When the driving element is activated, the first rotating member, the second rotating member and the annular optical member rotate synchronously. The excitation beam provided by the light source module enters the color wheel module through the dichroic layer, and transmits the illumination beam through the filter area and the transmission area. In this way, the number of elements of the color wheel module and the projection device may be reduced, thereby reducing the volume. At the same time, the luminous efficiency of the color wheel module may be improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
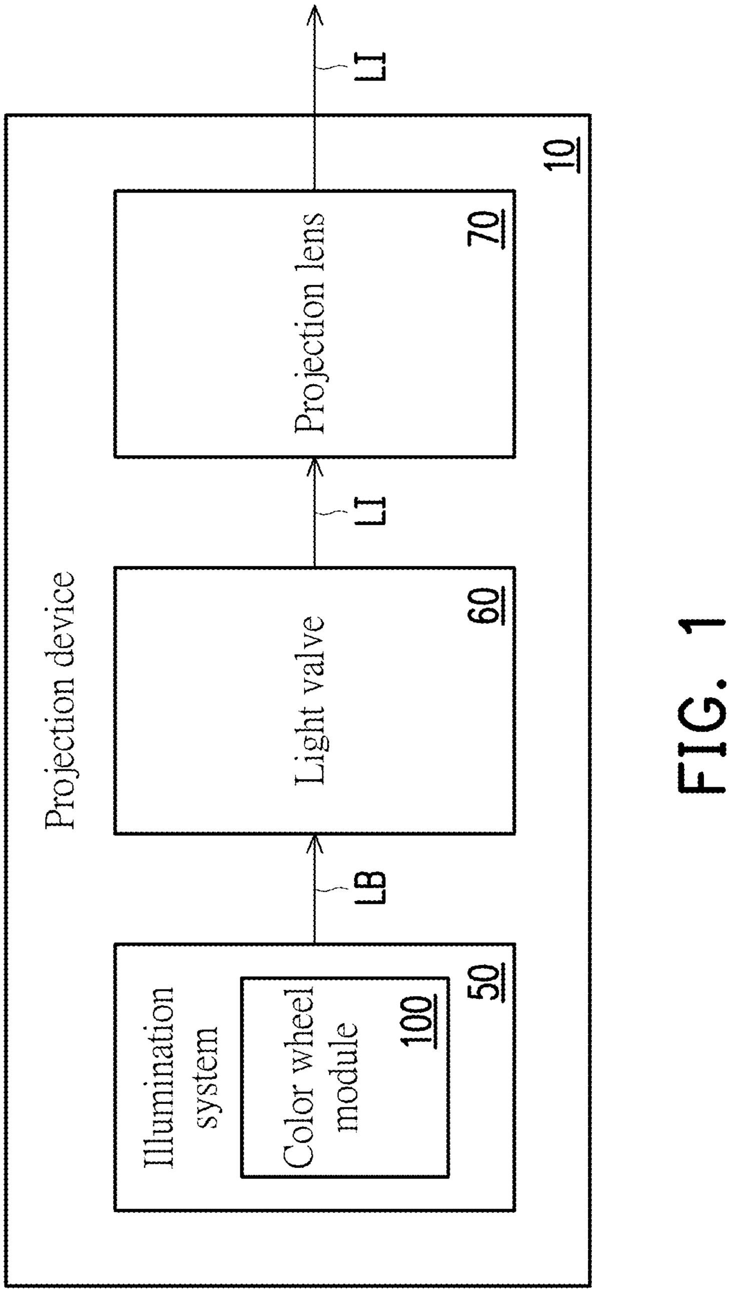
FIG. 1 is a schematic diagram of a projection device according to an embodiment of the disclosure.

FIG. 1 is a schematic diagram of a projection device according to an embodiment of the disclosure. Please refer to FIG. 1. The embodiment provides a projection device 10, including an illumination system 50, a light valve 60 and a projection lens 70. The illumination system 50 is configured to provide an illumination beam LB. The light valve 60 is disposed on the transmission path of the illumination beam LB, and is configured to convert the illumination beam LB into an image beam LI. The projection lens 70 is disposed on the transmission path of the image beam LI, and is configured to project the image beam LI out of the projection device 10 to a projection target (not shown), such as a screen or a wall.

The light valve 60 is, for example, a reflective light modulator such as a liquid crystal on silicon panel (LCoS panel) or a digital micro-mirror device (DMD). In some embodiments, the light valve 60 may also be a transmissive optical modulator such as a transparent liquid crystal panel, an electro-optical modulator, a magneto-optic modulator, an acousto-optic modulator (AOM). The disclosure does not limit the type and kind of the light valve 60. The detailed steps and implementation of the method for the light valve 60 to convert the illumination beam LB into the image beam LI may be obtained from the general knowledge in the art for sufficient teaching, suggestion and implementation description, and thus are not repeated here.

The projection lens 70 includes, for example, a combination of one or more optical lenses with diopters, such as various combinations of non-planar lenses including biconcave lenses, biconvex lenses, concave-convex lenses, convex-concave lenses, plano-convex lenses, and plano-concave lenses. In an embodiment, the projection lens 70 may further include a planar optical lens to project the image beam LI from the light valve 60 to the projection target in a reflective manner. The disclosure does not limit the type and kind of the projection lens 70.

Figure 2:
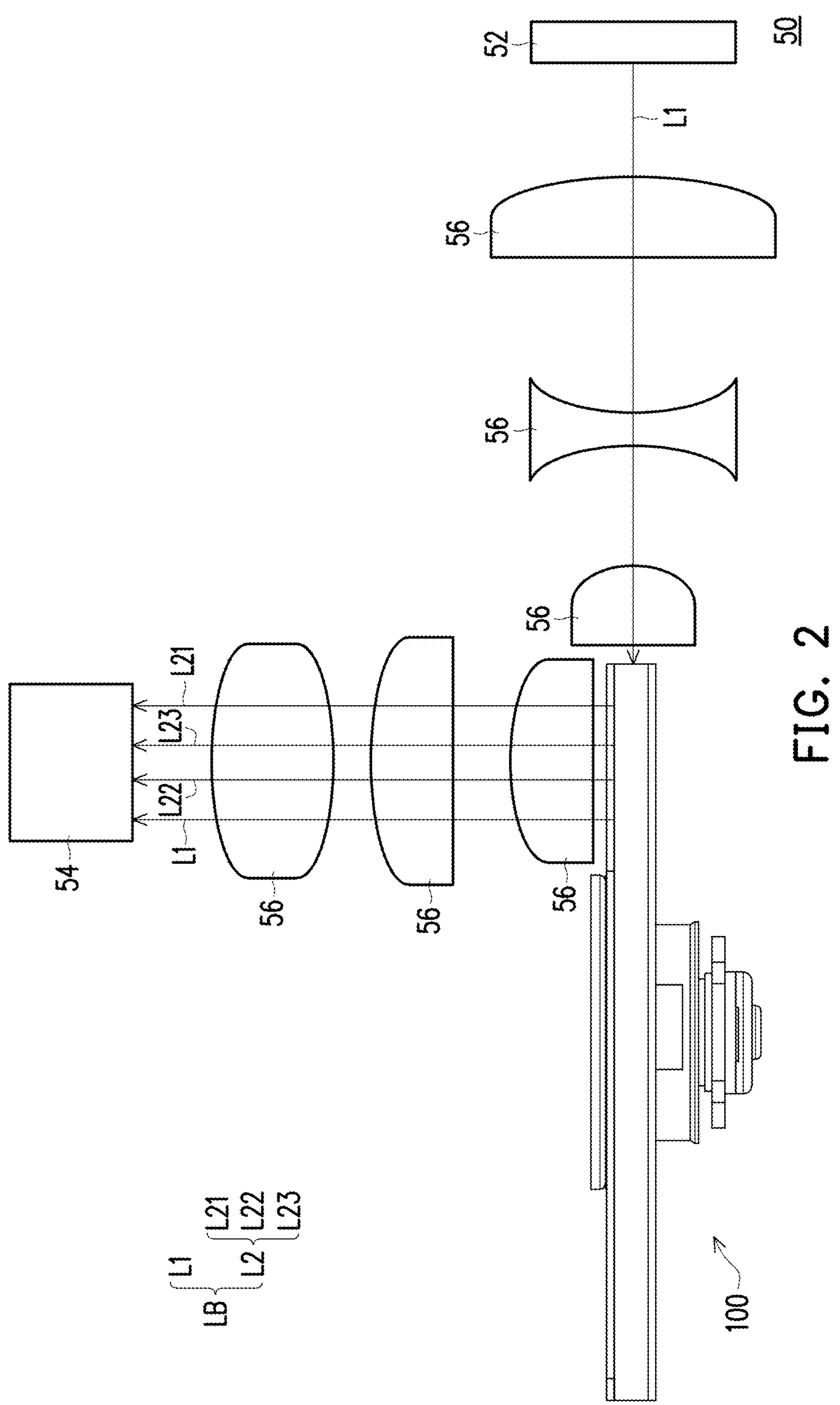
FIG. 2 is a schematic diagram of an illumination system according to an embodiment of the disclosure.

FIG. 2 is a schematic diagram of an illumination system according to an embodiment of the disclosure. Please refer to FIG. 1 and FIG. 2. The illumination system 50 shown in the embodiment may be applied to the projection device 10 in FIG. 1. The illumination system 50 is configured to provide an illumination beam LB. The illumination system 50 includes a light source module 52 and a color wheel module 100. The light source module 52 is configured to provide an excitation beam L1. The light source module 52 includes, for example, light emitting diodes (LEDs), a laser light source or combinations thereof, or other suitable light sources. The light source module 52 may, for example, provide a blue excitation beam L1. The color wheel module 100 is disposed on the transmission path of the excitation beam L1 and configured to convert the excitation beam L1 into a conversion beam L2. The conversion beam L2 may include, for example, a first conversion beam L21, a second conversion beam L22 and a third conversion beam L23 in different wavelength ranges. The excitation beam L1, the first conversion beam L21, the second conversion beam L22 and the third conversion beam L23 pass the color wheel module 100 to form the illumination beam LB, so the illumination beam LB includes at least one of the excitation beam L1 and the conversion beam L2. In the embodiment, the illumination system 50 may further include a light uniforming element 54 and multiple lens elements 56. The light uniforming element 54 is, for example, an integral rod or a fly eye lens array. The light uniforming element 54 is configured to adjust the shape of the light spot of the illumination beam LB, so that the shape of the light spot of the illumination beam LB can match the shape of the working area of the light valve 60 (for example, a rectangular shape), and the light uniforming element 54 may make the light spot of the illumination beam LB have uniform light intensity everywhere. The lens elements 56 may be various optical lenses, such as focusing lenses. More specifically, on the transmission path of the light beam, at least a focusing lens is respectively disposed before being incident on the color wheel module 100 and after exiting the color wheel module 100.

Figure 3:
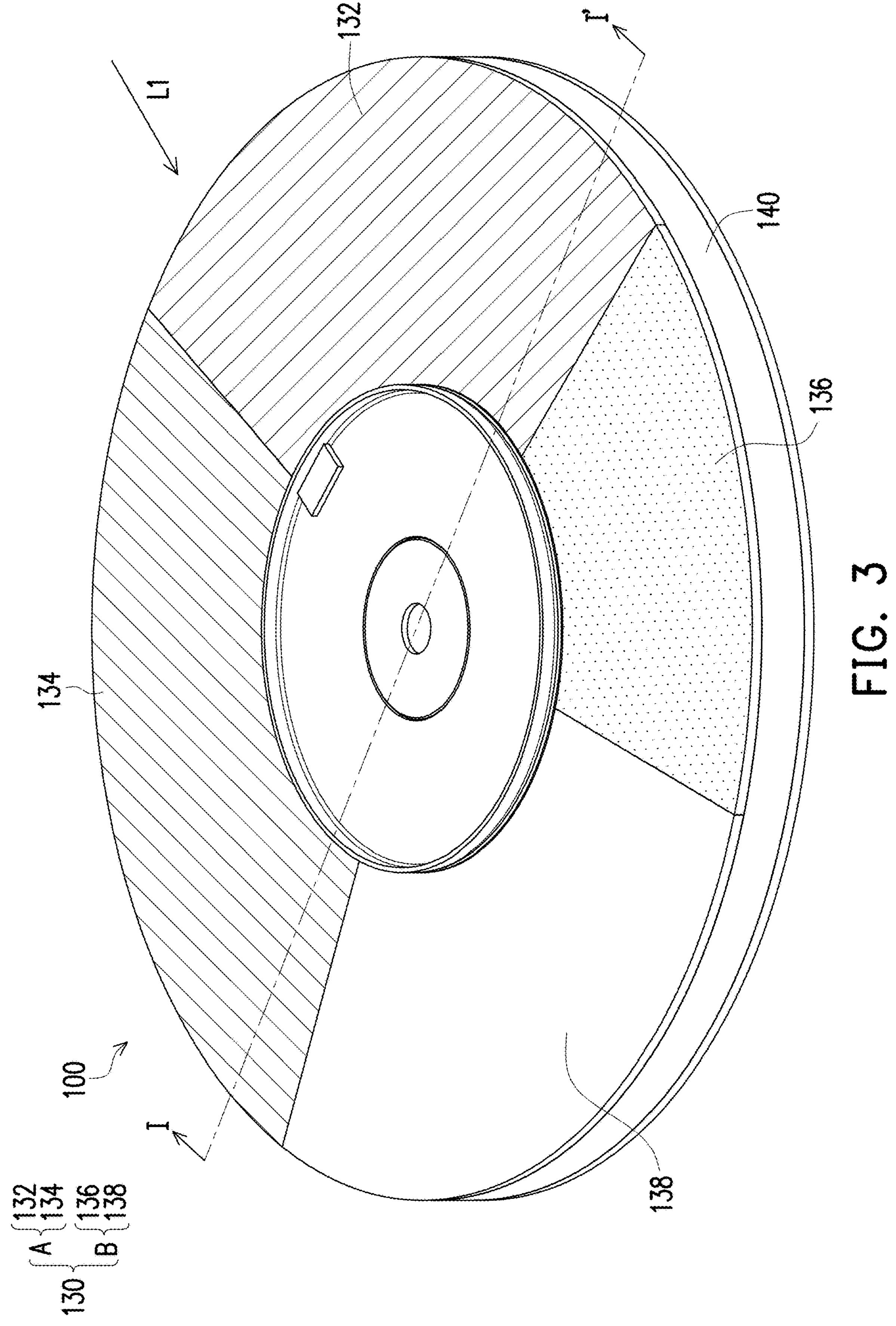
FIG. 3 is a schematic diagram of a color wheel module according to an embodiment of the disclosure.
Figure 4:
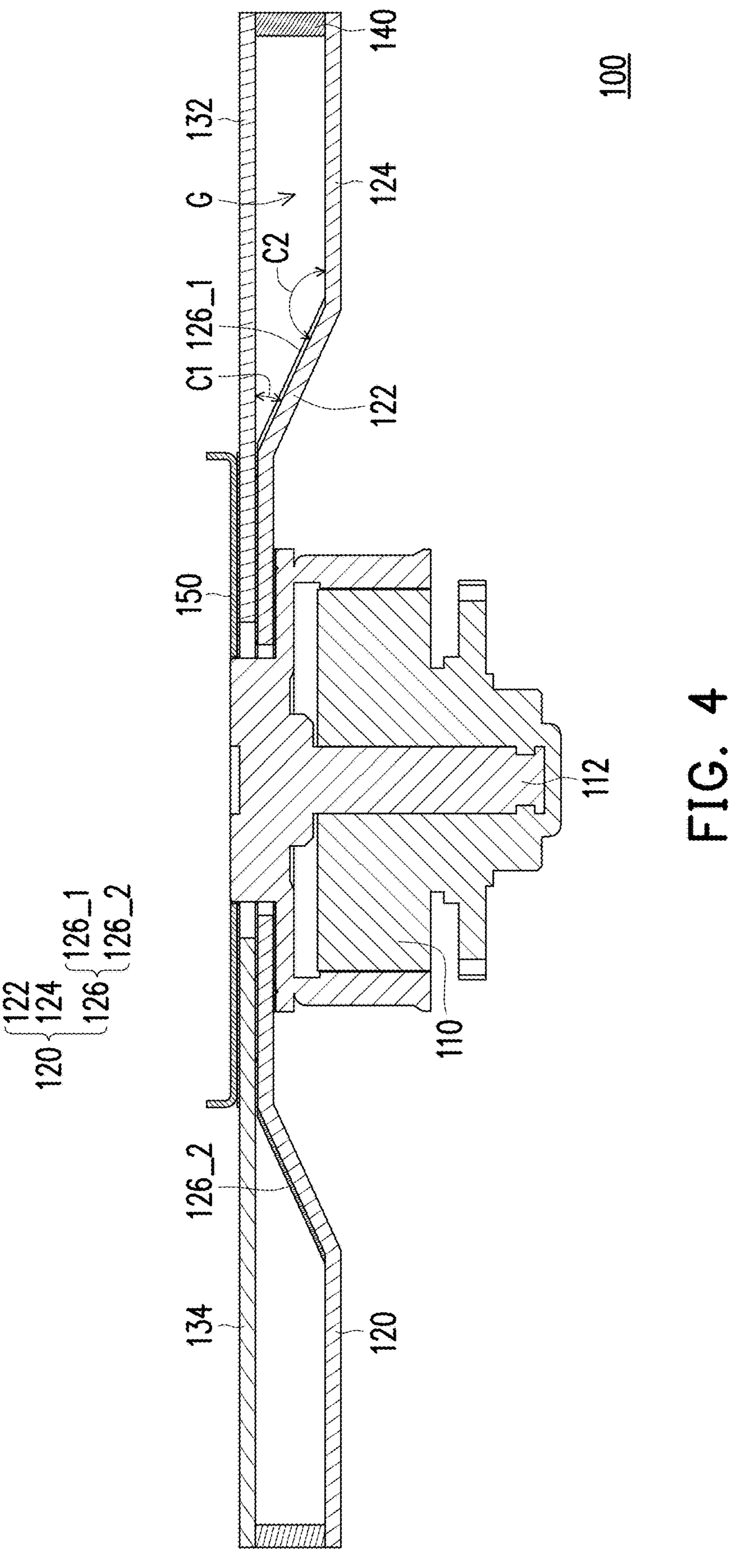
FIG. 4 is a schematic cross-sectional view of the color wheel module in FIG. 3 along a line I-I'.
Figure 5:
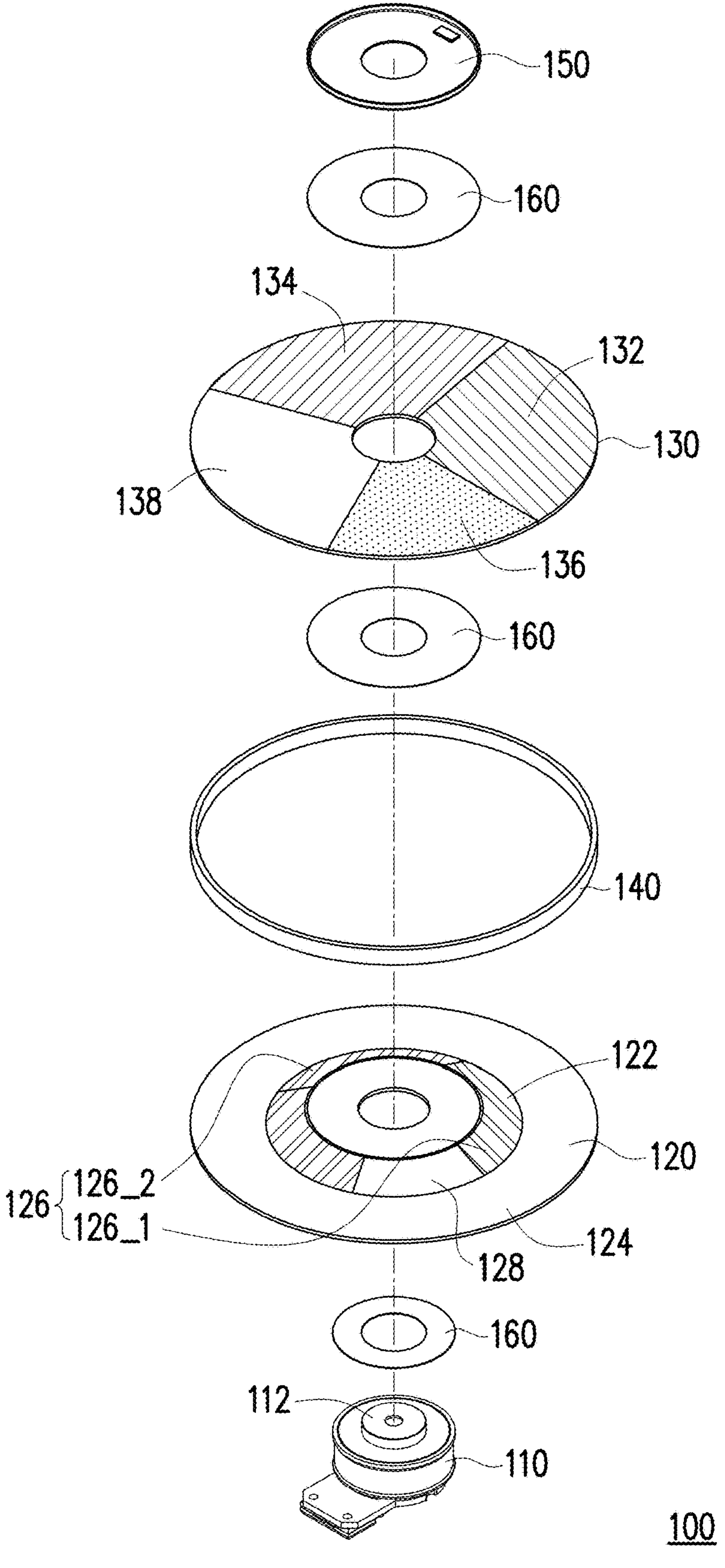
FIG. 5 is a three-dimensional exploded schematic diagram of the color wheel module in FIG. 3.

FIG. 3 is a schematic diagram of a color wheel module according to an embodiment of the disclosure. FIG. 4 is a schematic cross-sectional view of the color wheel module in FIG. 3 along a line I-I'. FIG. 5 is a three-dimensional exploded schematic diagram of the color wheel module in FIG. 3. Please refer to FIG. 3 to FIG. 5. The color wheel module 100 of the embodiment may be applied to the illumination system 50 in FIG. 2.

The color wheel module 100 is disposed on the transmission path of the excitation beam L1. The color wheel module 100 includes a driving element 110, a first rotating member 120, a second rotating member 130 and an annular optical member 140. The driving element 110 includes a rotating shaft 112, which is configured to drive the first rotating member 120 and the second rotating member 130 to rotate synchronously. The driving element 110 is, for example, a motor. The first rotating member 120 and the second rotating member 130 are disposed on the rotating shaft 112 of the driving element 110, and the second rotating member 130 is connected to the first rotating member 120. In addition, the annular optical member 140 is disposed between the first rotating member 120 and the second rotating member 130. The annular optical member 140 is, for example, the circumferential side wall of the color wheel module 100. The first rotating member 120 and the second rotating member 130 are, for example, disc-shaped. The annular optical member 140 may form an optical cavity G (shown in FIG. 4) with the first rotating member 120 and the second rotating member 130, and the annular optical member 140 rotates synchronously with the first rotating member 120 and the second rotating member 130. In the embodiment, the material of the annular optical member 140 is, for example, glass or plastic, and the annular optical member 140 includes a dichroic layer. The dichroic layer is configured to transmit the excitation beam L1 and reflect the conversion beam L2. The dichroic layer is, for example, a dichroic coating. In addition, the dichroic layer is the light incident surface of the color wheel module 100. In other words, the annular optical member 140 is disposed on the transmission path of the excitation beam L1 from the light source module 52. After the excitation beam L1 is transmitted from the light source module 52 into the color wheel module 100, the excitation beam L1 is transmitted in the optical cavity G and has an optical interaction with the first rotating member 120 and the second rotating member 130. In the embodiment, the extending direction of the annular optical member 140 is perpendicular to the extending direction of the first rotating member 120 and the second rotating member 130, that is, the radius of the first rotating member 120 and the radius of the second rotating member 130 are the same.

The first rotating member 120 includes a first reflective area 122, a second reflective area 124 and a wavelength conversion material 126. The second reflective area 124 is connected to the circumferential edge of the first reflective area 122, and the first reflective area 122 is inclined to the second reflective area 124. Specifically, the first reflective area 122 is connected to the second rotating member 130 and a first angle C1 is formed therebetween, and the first angle C1 is less than 90 degrees. Moreover, a second angle C2 is formed the first reflective area 122 and the second reflective area 124, and the second angle C2 is greater than 90 degrees. The first reflective area 122 and the second reflective area 124 are made of thin metal plates, for example. In other embodiments, the material of the first reflective area 122 and the second reflective area 124 may be, for example, sapphire, aluminum nitride, aluminum oxide, composite ceramics, or other metal alloys. The first reflective area 122 may be an inclined surface or a curved surface relative to the second reflective area 124, and the shape of the first reflective area 122, the first angle C1 and the second angle C2 may be adjusted and optimized according to the excitation beam L1 from the light source module 52. In the embodiment, the height of the bevel of the first reflective area 122 is greater than or equal to the length of the light spot formed when the excitation beam L1 is incident on the color wheel module 100, and the height of the bevel of the first reflective area 122 is greater than or equal to 1.5 millimeters (mm), for example. That is, the length of the orthographic projection of the first reflective area 122 on the rotating shaft 112 is greater than or equal to the length of the light spot formed when the excitation beam L1 is incident on the annular optical member 140, thus, the light use efficiency may be further improved. The wavelength conversion material 126 is disposed on the first reflective area 122 and is configured to convert the excitation beam L1 into a conversion beam L2. Specifically, in the embodiment, the wavelength conversion material 126 may include, for example, a first wavelength conversion material 126_1 and a second wavelength conversion material 126_2 that are circumferentially adjacent. The first wavelength conversion material 126_1 includes, for example, green phosphor, which is configured to convert the excitation beam L1 into the first conversion beam L21 that is green. The second wavelength conversion material 126_2 includes, for example, yellow phosphor, which is configured to convert the excitation beam L1 into the second conversion beam L22 that is yellow. In the embodiment, the first rotating member 120 further includes an optical layer 128 (shown in FIG. 5), which is disposed on the first reflective area 122. The optical layer 128 includes at least one of a reflective layer and a scattering layer, such as a reflective coating and a scattering material, respectively.

In the embodiment, the second rotating member 130 is parallel to the second reflective area 124 of the first rotating member 120, and the distance between the second rotating member 130 and the first reflective area 122 increases gradually in the direction away from the rotating shaft 112 in the radial direction. The material of the second rotating member 130 is, for example, glass or plastic. In addition, in the embodiment, the second rotating member 130 includes a filter area A and a transmission area B. The position of the filter area A corresponds to the wavelength conversion material 126 on the first reflective area 122, and the filter area A is configured to transmit the conversion beam L2 and reflect the excitation beam L1. Specifically, in the embodiment, the filter area A includes a first filter area 132 and a second filter area 134 that are circumferentially adjacent, the first conversion beam L21 generated by the first wavelength conversion material 126_1 is transmitted to the first filter area 132, and a part of the second conversion beam L22 generated by the second wavelength conversion material 126_2 is transmitted to the second filter area 134. Specifically, the first filter area 132 has a green filter, for example, so when the excitation beam L1 passes to the first wavelength conversion material 126_1 with green phosphor, the first wavelength conversion material 126_1 converts the excitation beam L1 that is blue is converted into the first conversion beam L21 that is green, and the first conversion beam L21 that is green passes through the first filter area 132 having a green filter. The second filter area 134 has a red filter, for example, so when the excitation beam L1 passes through the second wavelength conversion material 126_2 with yellow phosphor, the second wavelength conversion material 126_2 converts the excitation beam L1 that is blue into the second conversion beam L22 that is yellow, and a part of the second conversion beam L22 that is yellow passes to the second filter area 134 having a red filter to form the third conversion beam L23 that is red.

The position of the transmission area B corresponds to the wavelength conversion material 126 and the optical layer 128 on the first reflective area 122. The transmission area B includes a first transmission area 136 and a second transmission area 138 that are circumferentially adjacent. Specifically, the first transmission area 136 is, for example, coated with an anti-reflection coating and configured with a diffusion material on the upper surface and the lower surface of the first transmission area 136 of the second rotating member 130, so the excitation beam L1 that is blue reflected by the optical layer 128 on the first reflective area 122 is transmitted to the first transmission area 136 having a diffusion function. The second transmission area 138 is, for example, coated with anti-reflection coatings on the upper surface and the lower surface of the second transmission area 138 of the second rotating member 130, so another part of the second conversion beam L22 that is yellow generated by the second wavelength conversion material 126_2 passes to the second transmission area 138. In an embodiment, the above-mentioned second transmission area 138 may also be replaced by the filter area A with a yellow filter, and another part of the second conversion beam L22 that is yellow generated by the second wavelength conversion material 126_2 passes to the filter area A with a yellow filter. The position of the filter area A corresponds to the wavelength conversion material 126 on the first reflective area 122, and the position of the transmission area B corresponds to the optical layer 128 on the first reflective area 122.

The filter area A and the transmission area B are the light emitting surfaces of the color wheel module 100. In a direction parallel to the rotating shaft 112, the first wavelength conversion material 126_1 on the first rotating member 120 is disposed corresponding to the first filter area 132 of the second rotating member 130; the second wavelength conversion material 126_2 on the first rotating member 120 is disposed corresponding to the second filter area 134 and the second transmission area 138 of the second rotating member 130; and the optical layer 128 on the first rotating member 120 is disposed corresponding to the first transmission area 136 of the second rotating member 130. Therefore, when the driving element 110 is activated, the first rotating member 120, the second rotating member 130 and the annular optical member 140 rotate synchronously. The excitation beam L1 provided by the light source module 52 enters the color wheel module 100 through the annular optical member 140, and transmits the first conversion beam L21 that is green, the third conversion beam L23 that is red, the excitation beam L1 and the second conversion beam L22 that is yellow through the first filter area 132, the second filter area 134, the first transmission area 136 and the second transmission area 138 of the second rotating member 130 respectively. The above-mentioned light beams emitted by the color wheel module 100 are defined as the illumination beams LB. The illumination beam LB includes at least one of the first conversion beam L21, the second conversion beam L22, the third conversion beam L23 and the excitation beam L1.

In the embodiment, the path of the excitation beam L1 entering the color wheel module 100 and the path of the illumination beam LB leaving the color wheel module 100 are perpendicular to each other. More specifically, the excitation beam L1 is incident on the annular optical member 140 of the color wheel module 100 from a direction perpendicular to the rotating shaft 112 (parallel to the radial direction of the second rotating member 130), and exits the second rotating member 130 of the color wheel module 100 from a direction parallel to the rotating shaft 112. The color wheel module 100 of the embodiment may simultaneously achieve the effect of converting the wavelength of the excitation beam L1 and light filtering, and may achieve the effect of light path turning without the disposition of additional elements such as reflective mirrors. In this way, the number of elements of the illumination system 50 may be reduced, thereby reducing the volume. At the same time, the luminous efficiency of the color wheel module 100 may be improved, and the light path of being incident on and exiting the color wheel module 100 is a single path, which may achieve the effect of light beam uniform, easy assembly and adjustment of elements.

In addition, since the wavelength conversion material 126 is disposed on the first rotating member 120, a larger heat dissipation area may exists. The disposition of the optical cavity G formed by the first rotating member 120, the second rotating member 130 and the annular optical member 140 may prevent the filter area A and the transmission area B of the second rotating member 130 from affecting the heat dissipation of the wavelength conversion material 126. The optical cavity G of the embodiment is a closed space, and the filter area A of the second rotating member 130 has the characteristics of reflecting the excitation beam L1. Therefore, after the excitation beam L1 enters the optical cavity G from the annular optical member 140 and is incident on the wavelength conversion material 126, if the excitation beam L1 that is remaining and unconverted exists, such excitation beam L1 may be reflected by the filter area A on the second rotating member 130 and transmitted to the first reflective area 122 again for wavelength conversion until being converted into the conversion beam L2. In this way, in addition to improving the light conversion efficiency, the effect of converting multiple colors of light at the same time sequence may further be achieved.

In the embodiment, the color wheel module 100 may further include a balance module 150 and multiple connecting parts 160. The balance module 150 includes, for example, a metal ring and a balance substance, and the connecting parts 160 are, for example, thermally conductive glue or adhesive, and are respectively disposed between the balance module 150 and the second rotating member 130, between the second rotating member 130 and the first rotating member 120, and between the first rotating member 120 and the driving element 110.

Figure 6:
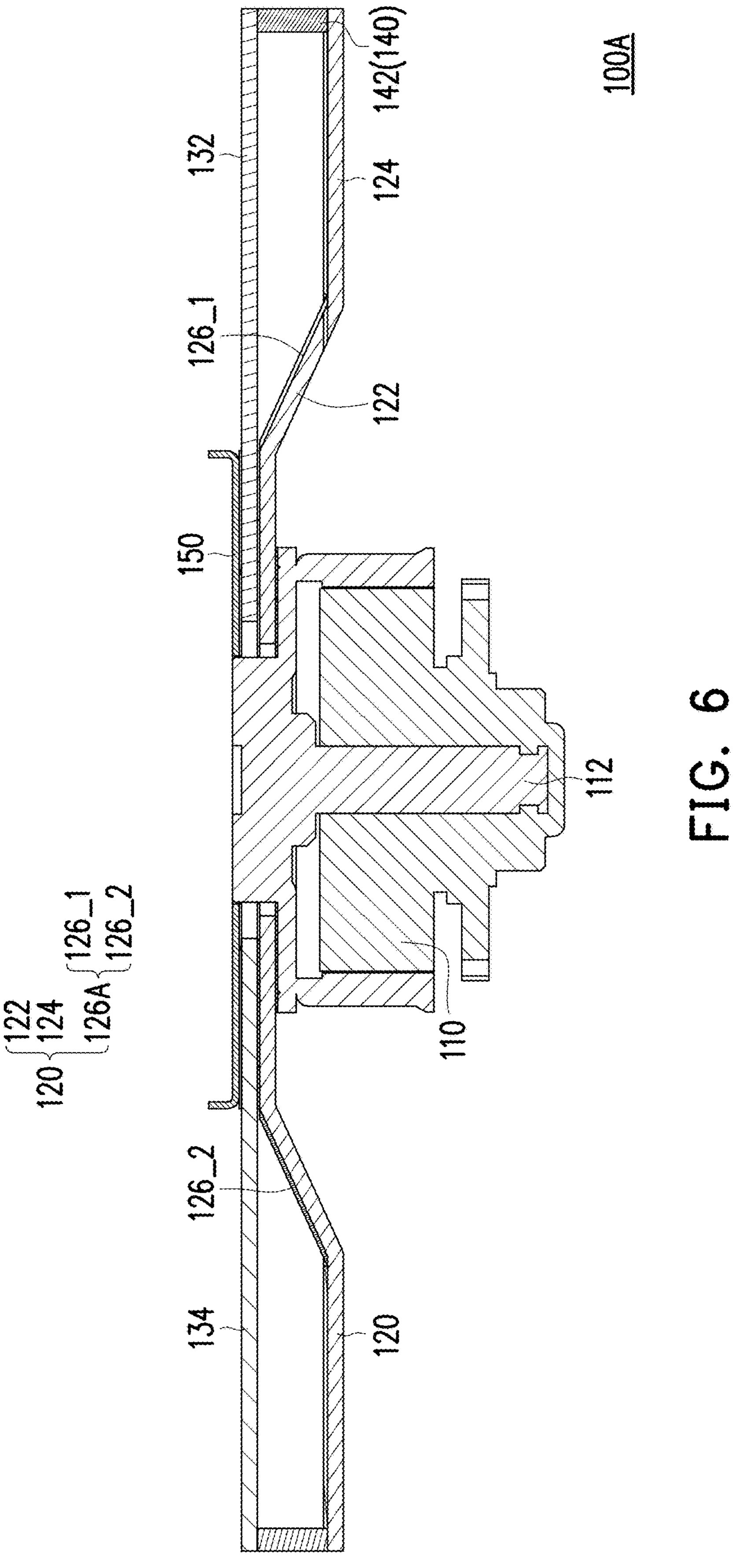
FIG. 6 is a schematic cross-sectional view of a color wheel module according to another embodiment.
Figure 7:
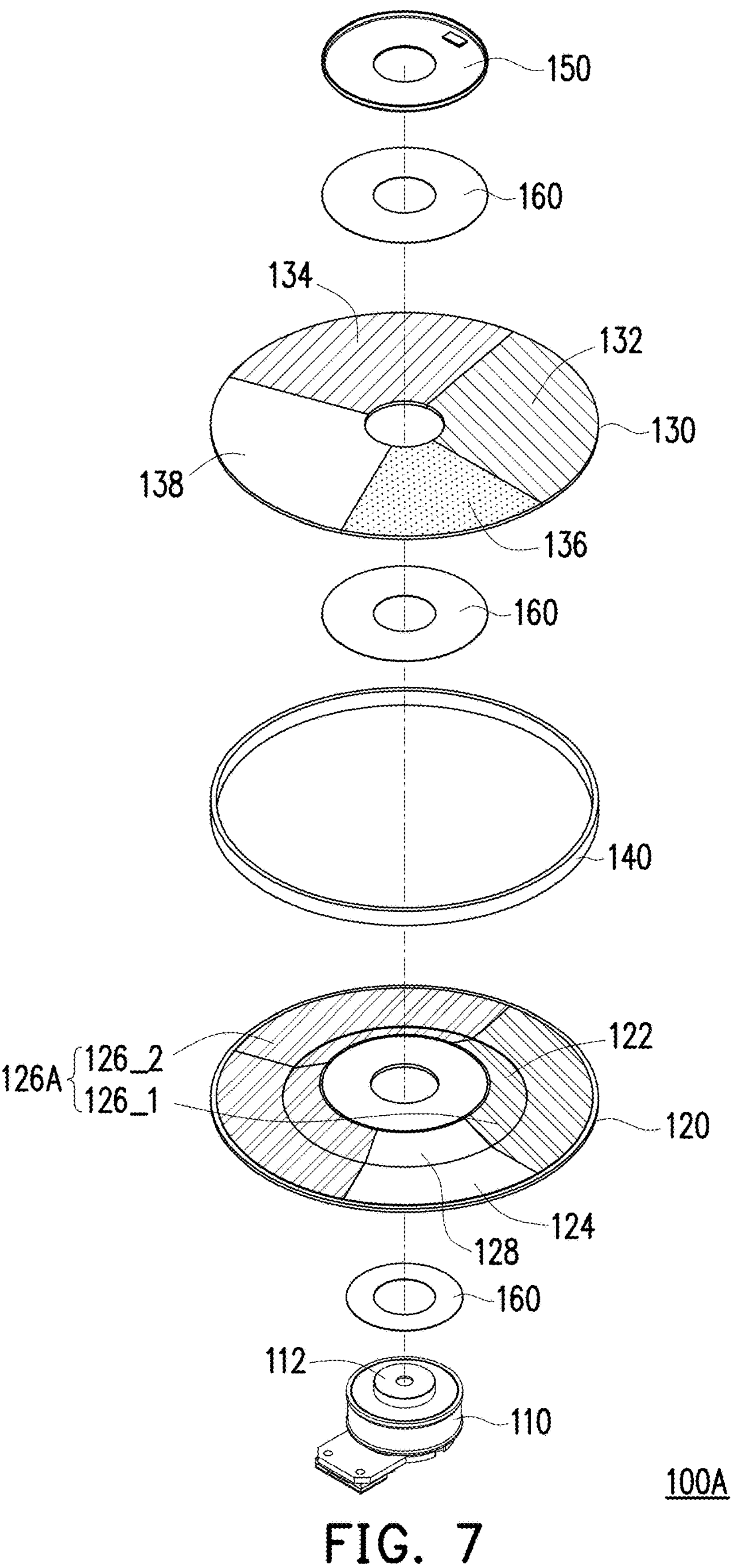
FIG. 7 is a three-dimensional exploded schematic diagram of the color wheel module in FIG. 6.

FIG. 6 is a schematic cross-sectional view of a color wheel module according to another embodiment. FIG. 7 is a three-dimensional exploded schematic diagram of the color wheel module in FIG. 6. Please refer to FIG. 6 and FIG. 7. The structure and advantages of a color wheel module 100A shown in the embodiment are similar to the color wheel module 100 shown in FIG. 4 and FIG. 5, and merely the differences are described below. In the embodiment, in addition to a wavelength conversion material 126A disposed on the first reflective area 122 of the first rotating member 120, the wavelength conversion material 126A is further disposed on the second reflective area 124. In detail, the first wavelength conversion material 126_1 and the second wavelength conversion material 126_2 that are circumferentially adjacent are disposed on the first reflective area 122 and the second reflective area 124. In other words, in the radial direction, the wavelength conversion material 126A on the first reflective area 122 and the second reflective area 124 is the same. In addition, the optical layer 128 of the first rotating member 120 is also disposed on the first reflective area 122 and the second reflective area 124. In this way, when the excitation beam L1 is incident on the wavelength conversion material 126A on the first reflective area 122, if the excitation beam L1 that is remaining and unconverted exists, such excitation beam L1 may be reflected by the filter area A on the second rotating member 130 to the second reflective area 124 for wavelength conversion. The color wheel module 100A of the embodiment may improve the light beam conversion efficiency, thereby enhancing the optical effect.

Figure 8:
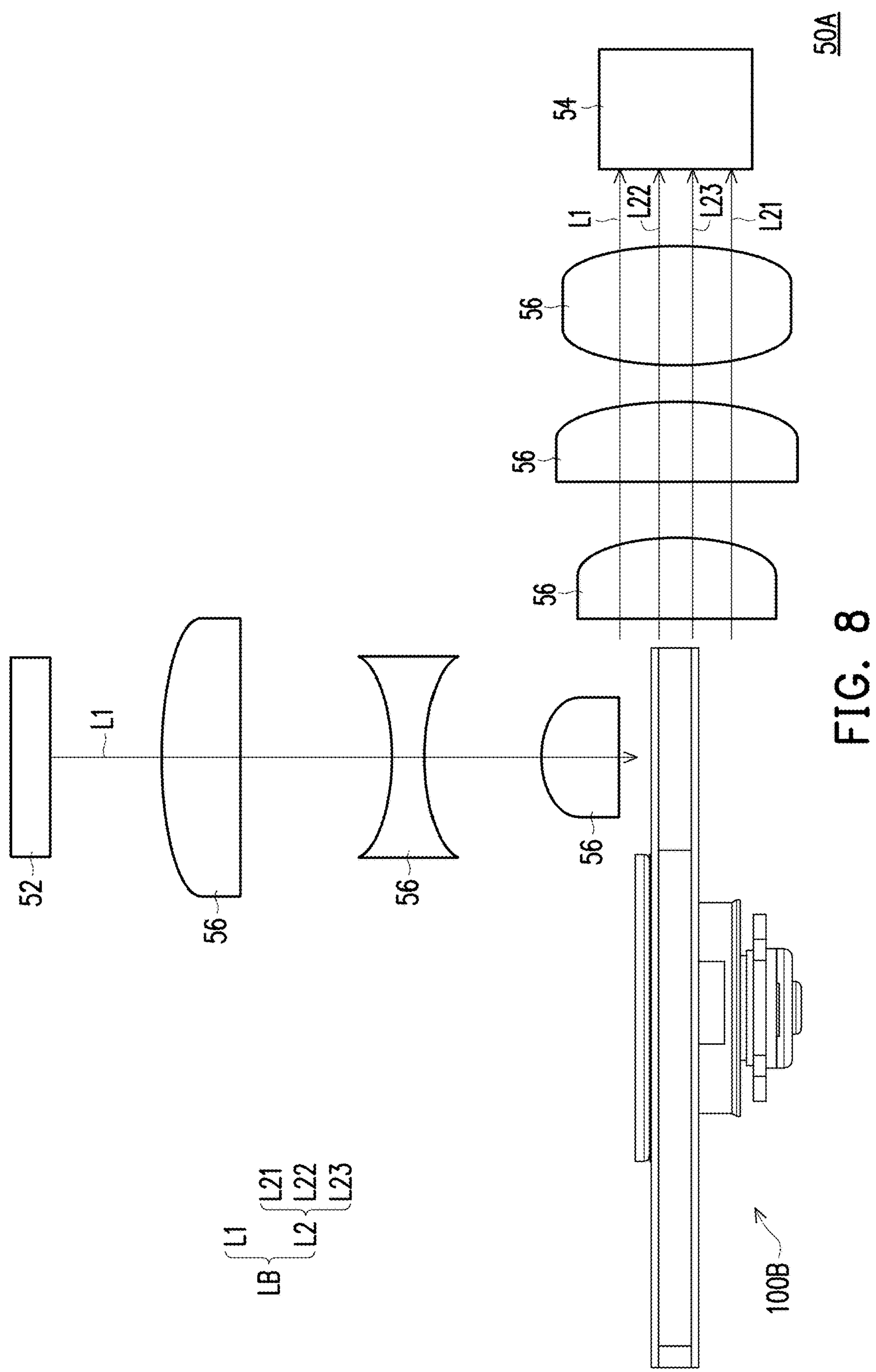
FIG. 8 is a schematic diagram of an illumination system according to another embodiment of the disclosure.
Figure 9:
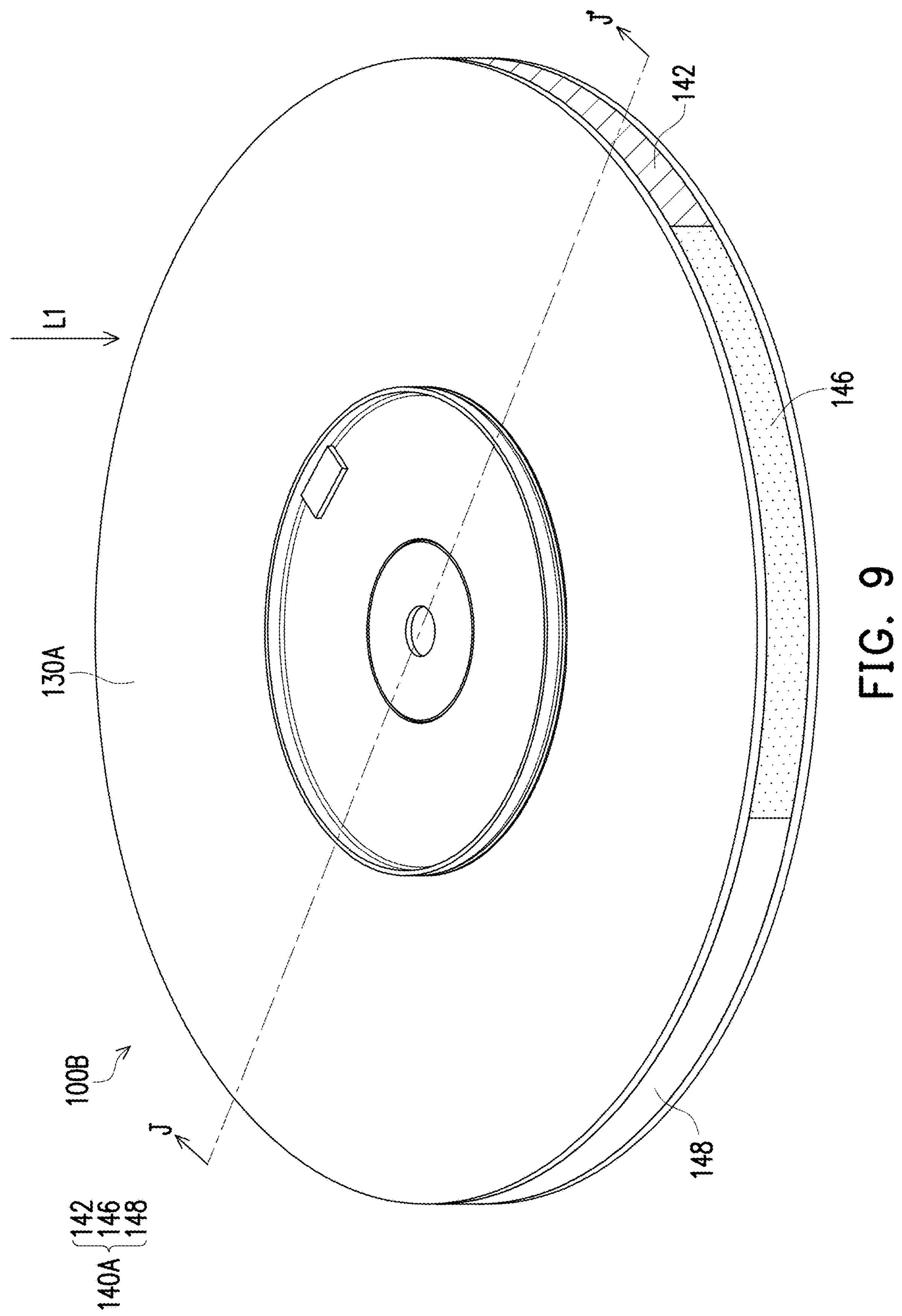
FIG. 9 is a schematic diagram of a color wheel module according to another embodiment of the disclosure.
Figure 10:
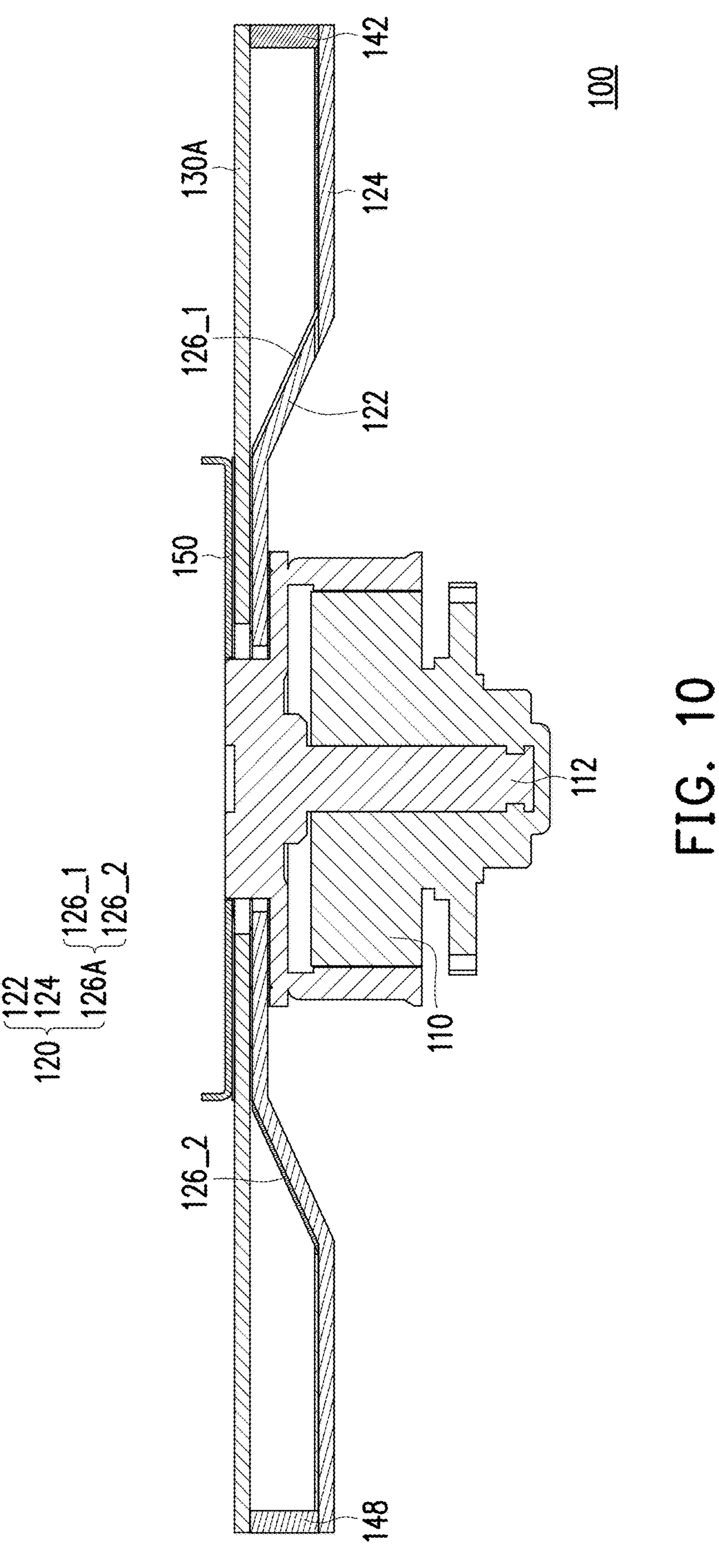
FIG. 10 is a schematic cross-sectional view of the color wheel module in FIG. 9 along a line J-J'.
Figure 11:
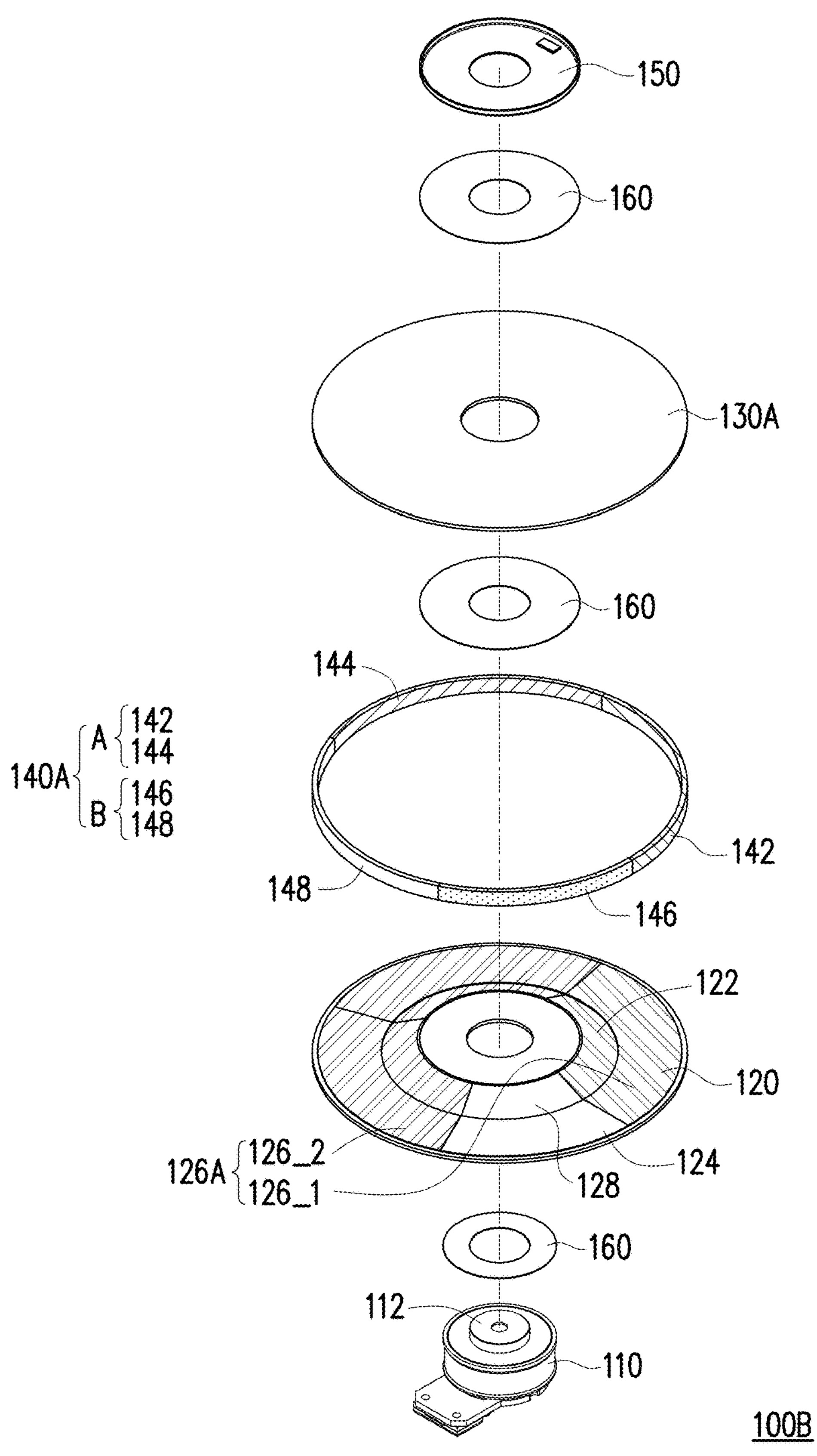
FIG. 11 is a three-dimensional exploded schematic diagram of the color wheel module in FIG. 9.

FIG. 8 is a schematic diagram of an illumination system according to another embodiment of the invention. FIG. 9 is a schematic diagram of a color wheel module according to another embodiment of the disclosure. FIG. 10 is a schematic cross-sectional view of the color wheel module in FIG. 9 along a line J-J'. FIG. 11 is a three-dimensional exploded schematic diagram of the color wheel module in FIG. 9. The structures and advantages of an illumination system 50A and a color wheel module 100B of the embodiment are similar to the illumination system 50 and the color wheel module 100 in FIG. 2 to FIG. 4, and merely the differences are described below. In the embodiment, the dispositions of the dichroic layer, the filter area A and the transmission area B are exchanged. In other words, a second rotating member 130A includes a dichroic layer, and an annular optical member 140A includes the filter area A and the transmission area B. The second rotating member 130A is disposed on the transmission path of the excitation beam L1 from the light source module 52. The excitation beam L1 is incident on the second rotating member 130A of the color wheel module 100B from a direction parallel to the rotating shaft 112, and exits the annular optical member 140A of the color wheel module 100B from a direction perpendicular to the rotating shaft 112 (parallel to the radial direction of the second rotating member 130A).

In the embodiment, the wavelength conversion material 126A is further disposed in the second reflective area 124. The position of the filter area A corresponds to the wavelength conversion material 126A on the first reflective area 122, and the filter area A includes a first filter area 142 and a second filter area 144 that are circumferentially adjacent. The first conversion beam L21 generated by conversion by the first wavelength conversion material 126_1 is transmitted to the first filter area 142, and a part of the second conversion beam L22 generated by conversion by the second wavelength conversion material 126_2 is transmitted to the second filter area 144. The transmission area B includes a first transmission area 146 and a second transmission area 148 that are circumferentially adjacent. In the radial direction, the first wavelength conversion material 126_1 on the first rotating member 120 is disposed corresponding to the first filter area 142 of the annular optical member 140A; the second wavelength conversion material 126_2 on the first rotating member 120 is disposed corresponding to the second filter area 144 and the second transmission area 148 of the annular optical member 140A; and the optical layer 128 on the first rotating member 120 is disposed corresponding to the first transmission area 146 of the annular optical member 140A. The excitation beam L1 that is blue reflected by the optical layer 128 is transmitted to the first transmission area 146 with a diffusion function, and another part of the second conversion beam L22 that is yellow generated by the second wavelength conversion material 126_2 is transmitted to the second transmission area 148. In the embodiment, since the illumination beam LB exits the annular optical member 140A of the color wheel module 100B, and the area of the annular optical member 140A is smaller than the area of the second rotating member 130A, the light emitting surface of the embodiment is smaller, and the illumination beam LB with a smaller beam cross-section may be formed. The geometric length of the beam cross-section of the illumination beam LB may be, for example, the distance between the second rotating member 130A and the first rotating member 120. In addition, since the first angle C1 exists between the second rotating member 130A and the first reflective area 122 of the first rotating member 120, the size of the beam cross-section of the illumination beam LB may be smaller than the size of the light spot formed when the excitation beam is incident on the second rotating member 130A, which may further reduce the volume of the elements (such as the light uniforming element 54 and the lens element 56) disposed on the transmission path of the illumination beam LB, and achieve the effect of reducing the volume of the illumination system 50A and the projection device 10.

To sum up, in the color wheel module and the projection device of the disclosure, the color wheel module includes a driving element, a first rotating member, a second rotating member and an annular optical member. When the driving element is activated, the first rotating member, the second rotating member and the annular optical member rotate synchronously. The excitation beam provided by the light source module enters the color wheel module through the dichroic layer, and transmits the illumination beam through the filter area and the transmission area. In this way, the number of elements of the color wheel module and the projection device may be reduced, thereby reducing the volume. At the same time, the luminous efficiency of the color wheel module may be improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A color wheel module, disposed on a transmission path of an excitation beam, the color wheel module comprising a driving element, a first rotating member, a second rotating member and an annular optical member, wherein:

the driving element comprises a rotating shaft, and the driving element is configured to drive the first rotating member and the second rotating member to rotate;

the first rotating member is disposed on the rotating shaft, and the first rotating member comprises a first reflective area, a second reflective area and a wavelength conversion material, wherein:

the second reflective area is connected to an outer edge of the first reflective area, and the first reflective area is inclined to the second reflective area; and the wavelength conversion material is disposed on the first reflective area, and is configured to convert the excitation beam into a conversion beam;

the second rotating member is disposed on the rotating shaft and connected to the first reflective area of the first rotating member; and the annular optical member is disposed between the first rotating member and the second rotating member to form an optical cavity with the first rotating member and the second rotating member, wherein one of the second rotating member and the annular optical member comprises a dichroic layer, and the other comprises a filter area and a transmission area.

2. The color wheel module according to claim 1, wherein the first rotating member further comprises an optical layer, disposed in the first reflective area, and the optical layer comprises at least one of a reflective layer and a scattering layer.

3. The color wheel module according to claim 1, wherein the wavelength conversion material is further disposed in the second reflective area.

4. The color wheel module according to claim 3, wherein the first rotating member further comprises an optical layer, disposed in the first reflective area and the second reflective area, and the optical layer comprises at least one of a reflective layer and a scattering layer.

5. The color wheel module according to claim 1, wherein the dichroic layer is configured to allow the excitation beam to pass through and reflect the conversion beam.

6. The color wheel module according to claim 1, wherein the dichroic layer is a light incident surface of the color wheel module, and the filter area and the transmission area are light emitting surfaces of the color wheel module.

7. The color wheel module according to claim 1, wherein an extending direction of the annular optical member is perpendicular to an extending direction of the first rotating member and an extending direction of the second rotating member.

8. The color wheel module according to claim 1, wherein a first angle is formed between the first reflective area and the second rotating member, and the first angle is less than 90 degrees.

9. The color wheel module according to claim 1, wherein a second angle is formed between the first reflective area and the second reflective area, and the second angle is greater than 90 degrees.

10. The color wheel module according to claim 1, wherein the first reflective area is a curved surface or an inclined surface relative to the second reflective area.

11. The color wheel module according to claim 1, wherein the second rotating member is parallel to the second reflective area, and a distance between the second rotating member and the first reflective area increases gradually in a direction away from the rotating shaft in a radial direction.

12. The color wheel module according to claim 1, wherein the wavelength conversion material comprises a first wavelength conversion material and a second wavelength conversion material that are circumferentially adjacent, the filter area comprises a first filter area and a second filter area that are circumferentially adjacent, a first conversion beam generated by the first wavelength conversion material is transmitted to the first filter area, and a second conversion beam generated by the second wavelength conversion material is transmitted to the second filter area.

13. The color wheel module according to claim 1, wherein a path of the excitation beam entering the color wheel module is perpendicular to a path of an illumination beam leaving the color wheel module, wherein the illumination beam comprises at least one of the excitation beam and the conversion beam.

14. The color wheel module according to claim 1, wherein a height of a bevel of the first reflective area is greater than or equal to a length of a light spot formed when the excitation beam is incident on the color wheel module.

15. A projection device, comprising an illumination system, a light valve and a projection lens, wherein:

the illumination system is configured to provide an illumination beam, and the illumination system comprises a light source module and a color wheel module, wherein:

the light source module is configured to provide an excitation beam; and the color wheel module is disposed on a transmission path of the excitation beam, and the color wheel module comprises a driving element, a first rotating member, a second rotating member and an annular optical member, wherein:

the driving element comprises a rotating shaft, and the driving element is configured to drive the first rotating member and the second rotating member to rotate;

the first rotating member is disposed on the rotating shaft, and the first rotating member comprises a first reflective area, a second reflective area and a wavelength conversion material, wherein:

the second reflective area is connected to an outer edge of the first reflective area, and the first reflective area is inclined to the second reflective area; and the wavelength conversion material is disposed on the first reflective area, and is configured to convert the excitation beam into a conversion beam; and the second rotating member is disposed on the rotating shaft and connected to the first reflective area of the first rotating member; and the annular optical member is disposed between the first rotating member and the second rotating member to form an optical cavity with the first rotating member and the second rotating member, wherein one of the second rotating member and the annular optical member comprises a dichroic layer, and the other comprises a filter area and a transmission area;

the light valve is disposed on a transmission path of the illumination beam, and is configured to convert the illumination beam into an image beam, wherein the illumination beam comprises at least one of the excitation beam and the conversion beam; and the projection lens is disposed on a transmission path of the image beam, and is configured to project the image beam out of the projection device.

16. The projection device according to claim 15, wherein the wavelength conversion material is further disposed in the second reflective area.

17. The projection device according to claim 15, wherein an extending direction of the annular optical member is perpendicular to an extending direction of the first rotating member and an extending direction of the second rotating member.

18. The projection device according to claim 15, wherein a first angle is formed between the first reflective area and the second rotating member, and the first angle is less than 90 degrees.

19. The projection device according to claim 15, wherein a second angle is formed between the first reflective area and the second reflective area, and the second angle is greater than 90 degrees.

20. The projection device according to claim 15, wherein the second rotating member is parallel to the second reflective area, and a distance between the second rotating member and the first reflective area increases gradually in a direction away from the rotating shaft in a radial direction.

21. The projection device according to claim 15, wherein a path of the excitation beam entering the color wheel module is perpendicular to a path of the illumination beam leaving the color wheel module.

22. The projection device according to claim 15, wherein a height of a bevel of the first reflective area is greater than or equal to a length of a light spot formed when the excitation beam is incident on the color wheel module.

* * * * *